United States Patent
Radatti

(10) Patent No.: US 7,917,744 B2
(45) Date of Patent: Mar. 29, 2011

(54) APPARATUS AND METHODS FOR INTERCEPTING, EXAMINING AND CONTROLLING CODE, DATA AND FILES AND THEIR TRANSFER IN INSTANT MESSAGING AND PEER-TO-PEER APPLICATIONS

(75) Inventor: Peter V. Radatti, Conshohocken, PA (US)

(73) Assignee: Cybersoft, Inc., Conshohocken, PA (US)

( * ) Notice: Subject to any disclaimer, the term of this patent is extended or adjusted under 35 U.S.C. 154(b) by 0 days.

(21) Appl. No.: 10/655,387

(22) Filed: Apr. 6, 2004

(65) Prior Publication Data

US 2004/0143763 A1 Jul. 22, 2004

Related U.S. Application Data

(63) Continuation-in-part of application No. 09/244,154, filed on Feb. 3, 1999, now Pat. No. 6,763,467.

(51) Int. Cl.
H04L 29/06 (2006.01)
G06F 11/30 (2006.01)
G06F 12/14 (2006.01)

(52) U.S. Cl. ............................ 713/151; 713/188; 726/24

(58) Field of Classification Search .................. 713/188, 713/200, 201, 151; 726/24
See application file for complete search history.

(56) References Cited

U.S. PATENT DOCUMENTS

| | | | |
|---|---|---|---|
| 5,126,728 A | 6/1992 | Hall | |
| 5,319,776 A | 6/1994 | Hile et al. | |
| 5,414,833 A | 5/1995 | Hershey et al. | |
| 5,481,735 A | 1/1996 | Mortensen et al. | |
| 5,511,163 A | 4/1996 | Lerche et al. | |
| 5,550,984 A | 8/1996 | Gelb | |
| 5,586,266 A | 12/1996 | Hershey et al. | |
| 5,623,600 A | 4/1997 | Ji et al. | |
| 5,682,428 A * | 10/1997 | Johnson | 705/71 |
| 5,761,424 A | 6/1998 | Adams et al. | |
| 5,802,178 A | 9/1998 | Holden et al. | |
| 5,832,208 A | 11/1998 | Chen et al. | |
| 5,832,228 A | 11/1998 | Holden et al. | |
| 5,889,943 A | 3/1999 | Ji et al. | |
| 5,916,305 A | 6/1999 | Sikdar et al. | |
| 5,931,917 A | 8/1999 | Nguyen et al. | |
| 5,950,211 A * | 9/1999 | Shealy | 1/1 |
| 5,983,348 A | 11/1999 | Ji | |
| 6,009,525 A * | 12/1999 | Horstmann | 713/200 |
| 6,088,803 A | 7/2000 | Tso et al. | |
| 6,115,393 A * | 9/2000 | Engel et al. | 370/469 |
| 6,178,505 B1 * | 1/2001 | Schneider et al. | 713/168 |
| 6,202,210 B1 * | 3/2001 | Ludtke | 725/20 |
| 6,356,951 B1 | 3/2002 | Gentry, Jr. | |
| 6,381,632 B1 * | 4/2002 | Lowell | 709/203 |
| 6,389,534 B1 * | 5/2002 | Elgamal et al. | 713/164 |

(Continued)

*Primary Examiner* — Michael Pyzocha
(74) *Attorney, Agent, or Firm* — John F. A. Earley, III; Frank J. Bonini, Jr.; Harding, Earley, Follmer & Frailey, P.C.

(57) ABSTRACT

The present invention comprises apparatus and methods for processing instant messaging or peer-to-peer code, that is, for intercepting, examining and/or controlling instant messaging and/or peer-to-peer code in a network. A protocol parser is implemented in order to intercept the code as it passes through the channel and transfer the code to a proscribed code scanner. "Man in the middle" technology may be used as well through decryptor/encryptor components placed between client and server which permit examination of the code by a proscribed code scanner as it passes through a communications channel. Embodiments for various platforms, including Unix® and Windows® NT are disclosed.

36 Claims, 7 Drawing Sheets

U.S. PATENT DOCUMENTS

| | | |
|---|---|---|
| 6,421,733 B1 | 7/2002 | Tso et al. |
| 6,453,343 B1 * | 9/2002 | Housel et al. ............... 709/213 |
| 6,549,937 B1 | 4/2003 | Auerbach et al. |
| 6,577,920 B1 * | 6/2003 | Hypponen et al. ............ 700/200 |
| 6,697,950 B1 * | 2/2004 | Ko ............................... 713/201 |
| 6,771,949 B1 * | 8/2004 | Corliss ......................... 455/413 |
| 6,959,318 B1 * | 10/2005 | Tso .............................. 709/203 |
| 2002/0004819 A1 | 1/2002 | Agassy et al. |
| 2002/0007453 A1 * | 1/2002 | Nemovicher ................ 713/155 |
| 2002/0087383 A1 * | 7/2002 | Cogger et al. ................ 705/10 |
| 2002/0163934 A1 * | 11/2002 | Moore et al. ................. 370/465 |
| 2003/0004688 A1 * | 1/2003 | Gupta et al. ................. 702/188 |
| 2003/0083977 A1 * | 5/2003 | Syed ............................. 705/37 |
| 2003/0131061 A1 | 7/2003 | Newton et al. |

* cited by examiner

US 7,917,744 B2

APPARATUS AND METHODS FOR INTERCEPTING, EXAMINING AND CONTROLLING CODE, DATA AND FILES AND THEIR TRANSFER IN INSTANT MESSAGING AND PEER-TO-PEER APPLICATIONS

CROSS-REFERENCE TO RELATED APPLICATIONS

This application is a continuation-in-part of U.S. Ser. No. 09/244,154, entitled "NETWORK TRAFFIC INTERCEPTING METHOD AND SYSTEM," filed on 02/03/1999, now issued as U.S. Pat. No. 6,763,467, by Peter V. Radatti and David J. Harding.

FIELD OF THE INVENTION

The present invention relates to apparatus and methods for intercepting, examining and controlling code, data and files and their transfer. More particularly, the present invention relates to apparatus and methods for intercepting, examining and controlling proscribed or predetermined code, data and files and their transfers in instant messaging and peer-to-peer applications.

BACKGROUND OF THE INVENTION

The rise of the Internet and networking technologies has resulted in the widespread transfer of code, data and files between computers. This material is not always what it seems to be. For example, code that is accessed on a remote machine and downloaded to a computer system can contain hostile algorithms that can potentially destroy code, crash the system, corrupt code or worse. Some of these hostile algorithms are viruses, worms, and Trojan horses.

Hostile, malicious and/or proscribed code, data and files ("code" as used hereinafter generally includes "text," "data" and "files") can infect a single computer system or entire network and so posit a security risk to the computer system or network. The user and/or administrator (generally referred to hereinafter as "user") may wish to intercept, examine and/or control such code. The user might also wish to intercept, examine and/or control other code and/or text as well, for example, text which the user does not know to be hostile, but wishes to intercept nonetheless, such as potentially sexually or racially harassing messages, unsolicited messages, etc. This latter type of code is known hereinafter as "predetermined code."

One method of transferring code, instant messaging, has become increasingly popular. Instant messaging may be used for real time text exchanges, as well as other exchanges, such as image transfer, voice and/or video chat, interactive games, code transfers, remote assistance, whiteboarding, code and/or application sharing, etc. Thus a user may transmit code through instant messaging as well as text messages.

The transmission of code through instant messaging may include hostile, malicious, predetermined and/or proscribed code (generally referred to hereinafter as "proscribed code.") Additionally, although messages themselves are usually clear text, encryption may be used on messages and/or code etc., e.g. through Secure Sockets Layer (SSL) and Secure Multi-Purpose Internet Mail Extension (S/MIME).

As with other transfers, it may be desired to secure instant messaging. However, instant messaging applications, such as AOL Instant Messenger (AIM), NET Messenger (including Windows Messenger, MSN Messenger, etc.), Yahoo Messenger, etc., may be difficult to secure for a number of reasons. For example, in an enterprise installation, IM applications may be installed illegitimately, and thus serve as a conduit for proscribed code. Even those installations that are legitimate may provide, through IM, proscribed code to the user's machine.

Indeed, since Instant Messaging protocols may make use of tunneling and port scanning in order to transmit messages, they may transmit proscribed code without detection. Thus, FTP, Telnet and/or HTTP ports for example may be used by an IM application. As these ports are often left open for other applications, it is difficult to shut them off for IM applications.

Similar problems exist with peer-to-peer and peer-to-peer like applications, e.g., Gnutella (peer-to-peer), Kazaa (peer-to-peer like, as it utilizes a central server.) (Both are referred to herein as "peer-to-peer" or "P2P.") These applications may be installed illegally or without authorization on a system, and may make use of tunneling, port scanning and other techniques making detection difficult.

Therefore, it would be beneficial to have apparatus, methods and articles of manufacture to simply and effectively intercept, control, and/or examine incoming and outgoing instant messaging and/or peer-to-peer code in an efficient and effective manner transparently or almost transparently to the end-user, with little or no operational effort required by the user.

It would further be beneficial to have apparatus, methods and articles of manufacture to simply and effectively intercept, control, and/or examine incoming and outgoing secure instant messaging and/or peer-to-peer code in an efficient and effective manner transparently or almost transparently to the end-user, with little or no operational effort required by the user.

SUMMARY OF THE INVENTION

The present invention comprises apparatus and methods for processing instant messaging and/or peer-to-peer code, that is, for intercepting, examining and/or controlling instant messaging and/or peer-to-peer code in a network. Apparatus embodiments may comprise a protocol parser and a proscribed code scanner. The protocol parser intercepts instant messaging or peer-to-peer code on a communications channel. The protocol parser then transmits the code to the proscribed code scanner for review.

"Man in the middle" technology is used as well in certain embodiments in order to examine encrypted, e.g., SSL, S/MIME, etc. code. Decryptor/encryptor components permit examination of the encrypted code by a proscribed code scanner once intercepted by a protocol parser.

Embodiments for various platforms, including Unix® and Windows® NT are disclosed as well. Method embodiments are also disclosed.

DETAILED DESCRIPTION OF THE PREFERRED EMBODIMENTS

Figure 1:
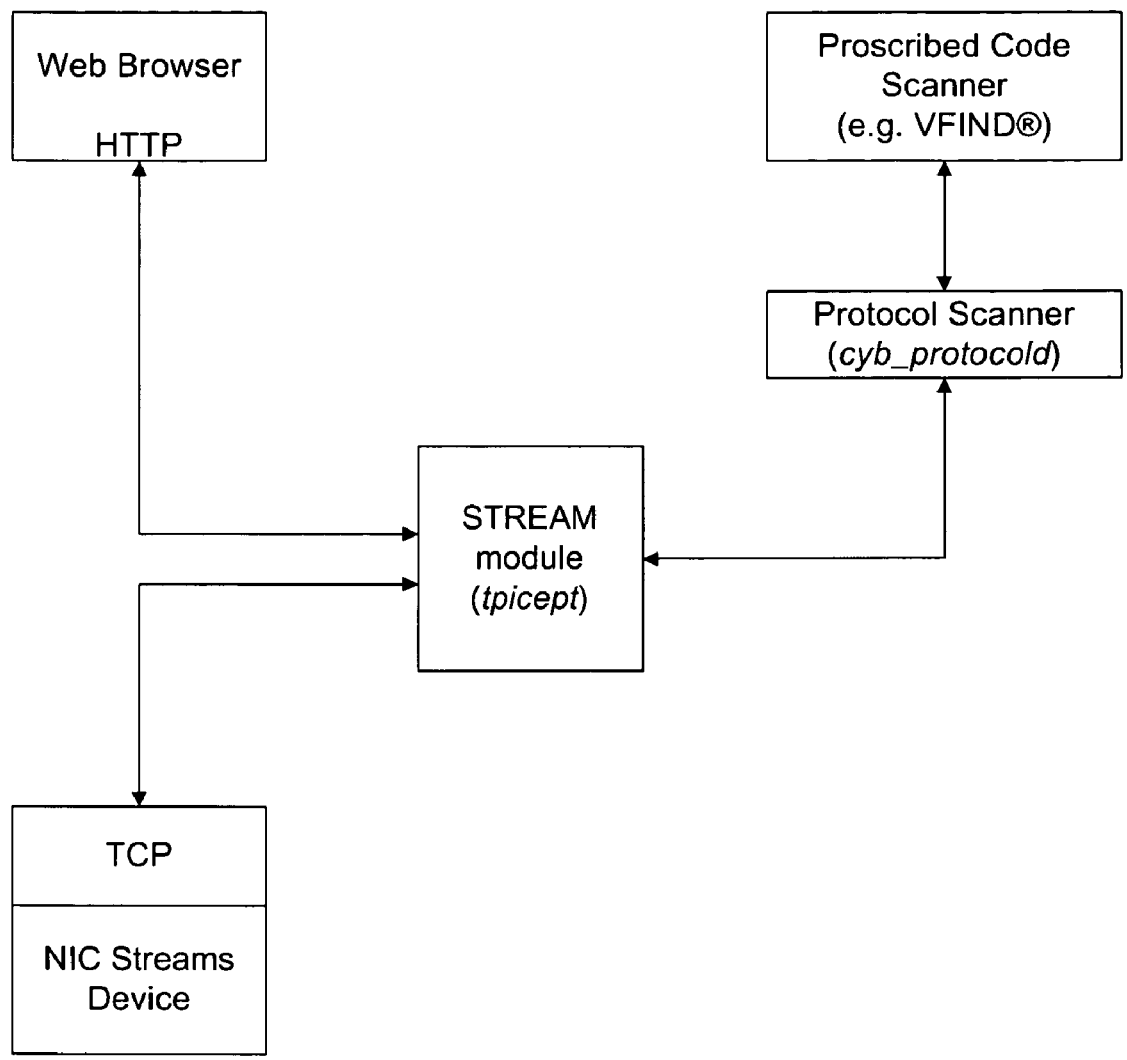
FIG. 1 is a schematic diagram of operation of a preferred embodiment.

The present invention comprises apparatus, methods and articles of manufacture for intercepting, examining, and controlling code. The present invention may operate on a single computer system or multiple systems depending on the operating system and other variables. The preferred embodiments process, that is, intercept, examine, and/or control any or all instant messaging and/or peer-to-peer code transferred through any number of connections in a computer or network. Intercepting, examining and/or controlling instant messaging and/or peer-to-peer code includes but is not limited to monitoring, blocking, logging, quarantining, discarding or transferring code.

The preferred embodiments monitor instant messaging and/or peer-to-peer code using a protocol parser which may be placed on a client, a server, a peer and/or other systems or components. In the especially preferred Unix® embodiments, the protocol parser is a Unix® STREAMS module and driver activated when an application opens a STREAMS device of the proper type. In the especially preferred Windows® NT embodiments, the protocol parser is a WinNT driver activated when an application opens a communications channel.

In the especially preferred embodiments, the protocol parser is placed so as to intercept code passing through any channel using TCP and/or UDP (referred to hereinafter as "TCP".) Other possible parameters in the especially preferred embodiments include interception of code traveling to specific instant messaging and/or peer-to-peer port numbers, or code traveling in specific directions (e.g. from an external network to internal network). Code parameters, as well, may be used as interception parameters.

The intercepted code is sent by the parser to a protocol scanner. The protocol scanner in turn reviews the code it has received from the parser. Depending upon its configuration, which in the preferred embodiments include port interception designation, file type interception designation, instant messaging content and/or other parameters, the protocol scanner will pass some, all, or none of the code flowing through it to a proscribed code scanner. This proscribed code scanner may be an antivirus scanner, pattern scanner, and/or content scanner or other types. This proscribed code scanner, depending on its settings, may pass some, all or none of the code passing through it.

If the code passing through the intercept module is not intercepted, that is, passed to the protocol scanner, it is returned to the communications channel. Similarly, if the code passing through the protocol scanner is not intercepted, that is, passed to the proscribed code scanner, it is returned to the communications channel.

Thus, the embodiments of the present invention process code by intercepting or diverting code from a communication channel, processing it, and then reintroducing it (or not as desired) into that channel. By intercepting or diverting code from a communication channel, the preferred embodiments do not change the nature of the communication, and process code transparently to the applications, unless a problem is discovered. In that case, the preferred embodiments may, if desired, be configured to notify the application and/or the user, among other actions.

When the parser intercepts a request from a client or server for an SSL transfer the parser creates a new SSL server that communicates with the original client and a new SSL client that communicates with the original server. The SSL server and SSL client may then intercept any and all communications that occur between the original SSL client and original SSL server.

The preferred embodiments will also intercept and review S/MIME messages. The S/MIME messages will be intercepted by the protocol parser and sent to a S/MIME decryptor. The decrypted messages can then be scanned by a proscribed code scanner, which may be an antivirus scanner, pattern scanner, and/or content scanner or other types. The proscribed code scanner will then review the code and signal whether the S/MIME message may be released from interception.

A preferred embodiment of the present invention runs on a Unix® platform that supports STREAMS such as System V, Sun Solaris®, IBM AIX®, HP-UX®, etc. The use of STREAMS in this embodiment promotes ease of installation and use. For example, installation on a computer of this STREAMS embodiment means the Unix® kernel on the computer would not have to be recompiled as might be the case with a non-STREAMS embodiment.

The following description of the embodiments uses Sun Solaris® operating system Unix® terminology. However, it should be specifically understood that embodiments can be implemented in other Unix® and Unix®-like platforms, including but not limited to Linux® and its variants, OS X, as well as other operating system platforms and code including but not limited to Microsoft Windows® XP, Windows® NT, Windows® 2000, Windows® 95, 98 CE and Me, IBM OS/390, MacOS, VxWorks,® Palm OS, Symbian, Java and others. Although the present invention can be implemented on various platforms, the preferred embodiments are used in Unix® and various Windows® environments, such as NT, 2000, 95, 98 and Me.

Moreover, those skilled in the art will appreciate that the invention may be practiced with other electronic device and computer system configurations, using TCP/IP or similar communications protocols, such as wired and wireless handheld devices and/or computers, cell phones and other wired and wireless communication devices, digital audio and video devices, distributed computing environments, multi-processor systems, and microprocessor-based or programmable consumer electronics, such as smart printers, network PCs, minicomputers, mainframe computers, and the like. For example, embodiments may be used to process code transmitted via short messaging services or other cellular services.

The preferred embodiments are comprised of both platform dependent and platform independent code as well, thus increasing portability and simplifying porting to new platforms. Generally, the embodiments will comprise both types of code although it is possible and within the scope of the present invention to construct an embodiment wholly in platform dependent code. Similarly it is possible and within the scope of the present invention to construct an embodiment wholly in platform independent code.

The preferred embodiments that run in a Unix®-STREAMS environment are generally invisible. At least part of those embodiments operate within the Unix® kernel, and so a brief review of the operation of the kernel would be helpful to understanding those embodiments.

The Unix® kernel is the operating system. The kernel is invisible to the user yet controls the system resources and hardware. For example, the user may want to use a telecommunications program in order to call another computer. She opens the program and instructs the program to call a mainframe. The program in turn issues a call to the kernel to open the communications device, in this case a serial port device. The kernel receives the call and looks up the device in its character device switch table. The character device switch table provides the kernel with the appropriate device specific routine: in this case an open call. Subsequent commands from the program will be similarly interpreted by the kernel.

In a Unix®-STREAMS platform, any specific devices with a STREAMS implementation (a STREAMS device) have a special field in the character device switch table that points to a streams initialization structure. Opening the STREAMS device will open the STREAMS device driver as well as create a Stream head to access the device driver. One or more STREAMS modules may be inserted between the STREAMS device and Stream head. STREAMS modules can process code passing through the Stream. If, for example, taking the above example regarding the opening of a telecommunications program, the user opens her program in a Unix®-STREAMS environment with a STREAMS serial port device, when the program calls the kernel to open the serial port device, a STREAMS serial port device driver will be opened and a Stream head will be created. A STREAMS module may be inserted as well depending on the configuration of that particular Stream. STREAMS modules are generally inserted into the Stream automatically through use of an "autopush" list which is referred to by the kernel when a Stream is opened.

Returning now to the description of the preferred embodiments, installation of this embodiment begins with installing tpicept, a kernel module, in an appropriate directory or directories, in order to provide the module to the kernel when called. In the especially preferred embodiments, tpicept will provide both a STREAMS module as well as a STREAMS device driver to the system as is discussed in further detail below. tpicept is linked to a number of path names, so that the file can be called by a number of names and used in a number of ways, e.g., links are established in /usr/kernel/drv and /usr/kernel/strmod so that the file may be used both as a STREAMS driver and STREAMS module. The protocol scanner cyb_protocold and the proscribed code scanner are also installed at this time in appropriate directories, e.g., /usr/sbin.

When installing the preferred embodiments, the "old" or existing autopush lists for the TCP protocol layer and a new list containing the STREAMS module tpicept is added. Thus tpicept will be pushed onto the stream that is created when a TCP streams device is opened.

The embodiments may be started by any of a number of manners as is known in the art. For example, no separate procedure is necessary to start the operation of the kernel module tpicept. It operates as soon as called.

A protocol scanner and proscribed code scanner, as described further below, may also be made operational through an executable file. The configuration of the preferred embodiments also allows for loading on startup of the system. Of course, other embodiments may load when desired by the user. However, loading upon start-up limits user tampering with the security procedures which may be desirable for network administration.

Once installed, the embodiment is operational. The embodiment remains in the system until a STREAMS device—such as an instant messaging or peer-to-peer process—that the embodiment has been configured to intercept is opened. The especially preferred embodiments intercept code at the TCP layer, however, the Unix® embodiments of the present invention are not limited to interception at the TCP layer. Rather, the Unix® embodiments of the present invention can intercept, examine and/or control code in any Stream. Of course, other embodiments, on other platforms, may also intercept code at other locations on a communications channel or layers in a communications stack.

For example, in preferred Unix® embodiments, when a Web browser or other application opens a STREAMS device, a STREAMS module tpicept will be inserted in the stream. FIG. 1 shows an example of a process of a preferred embodiment. As shown in FIG. 1, tpicept intercepts code passing in the stream. (The remainder of the stream or communications stack is not shown here.) (If the Web browser opens a secure connection, for example the HTTPS connection shown in the figure, the tpicept module will detect the opening and call a protocol SSL server and protocol SSL client, as is described in more detail below.)

Code passing back and forth between the Web browser and the NIC STREAMS device is being intercepted at the HTTP-TCP interface by the STREAMS module tpicept. tpicept, may or may not transfer the code to a protocol scanner, cyb_protocold, depending upon, in this embodiment, specific configurations that include port interception settings. (The dashed line in the figure shows this optional transfer.) For example, if tpicept has been configured so as to only intercept AIM (America OnLine Instant Messaging) communications on port 5190 (as a default), only code passing through port 5190 will be sent to cyb_protocold. Code traveling to another port (e.g., through SMTP on port 25 from a mail application) will be returned to the communication stack.

It should be noted that the preferred embodiments scan incoming code packets by examining the header information contained on those packets. For example, in TCP/IP protocol the internal address of any particular packet within a system (including port number) is contained in the header. By reviewing the header, the protocol scanner of the preferred embodiments can intercept packets sent to a predetermined port.

The STREAMS module may also be configured by varying its insertion at any particular data communications layer and/or protocol. In this embodiment, the module is inserted to intercept code at the upstream side of TCP. The STREAMS module has been inserted here in this embodiment because TCP is a multiplexer for different applications and connections, including those applications and connections to the Internet. Thus, this embodiment intercepts traffic at a "choke point" of the system. Of course, in other embodiments, other protocols and/or other layers may be intercepted as desired.

Returning to FIG. 1, if tpicept intercepts the code according to its configuration, it sends the code (through a STREAMS queue pair not shown here) to the protocol scanner, cyb_protocold. Cyb_protocold then may transfer the code to the proscribed code scanner through interprocess communication, e.g., a pipe. (The dashed line in the figure shows this optional transfer.) The decision by cyb_protocold to transfer the code depends upon its configuration settings and these settings can be varied as desired in this embodiment.

For example, a default setting for AIM (American Online Instant Messaging) may be port 5190. Thus, the scanner may be configured to intercept code on specific TCP ports such as port 5190. (As should be clear, both the protocol scanner and the STREAMS module can be configured by port interception settings). Moreover, the scanner may also be configured to intercept certain file types attached to the instant message, such as *.exe files, etc.

As another example, the protocol scanner could be configured as a protocol dependant scanner, that is, to presume that traffic on particular port will always be a certain protocol. Those ports which have not been configured for interception by this embodiment will pass traffic transparently. Alternatively, "protocol independent" scanning, that is, scanning by ignoring the actual port used, could be configured. Protocol independent scanning provides a higher level of security and may be desirable in some cases when non-standard ports are used for well-known protocols (such as changing the AIM port from its default port 5190.)

Protocol independent scanning embodiments may be especially useful in intercepting, controlling, and/or examining incoming and outgoing instant messaging and/or peer-to-peer code because of the ability of these programs to use other than their well known ports. That is, instant messaging and/or peer-to-peer programs can switch ports as they are being used. Thus, embodiments using direct examination of the code will be able to detect code transfers to and from instant messaging and/or peer-to-peer programs.

Direct data examination may occur in number of ways. For example, direct data examination may occur through examining the initial handshake of code sent to and/or from the instant messaging or peer-to-peer program; examining header(s) in the code, examining code format, etc. In the preferred embodiments using direct data examination, a code decryptor such as that presently available from CyberSoft, Inc. under the name UAD® may be used to deconstruct the code for review by the proscribed code scanner.

It should be noted that configuration may be manual or automatic, so that, for example, upon installation of more than one instant messaging applications, the configuration is set to include those ports and other parameters that differ between the two applications.

If the code is not sent by the protocol scanner to the proscribed code scanner, it is returned to the STREAMS module, and then to the Stream.

If the code is sent by the protocol scanner to the proscribed code scanner, (e.g., a proscribed code scanner such as that presently available from CyberSoft, Inc. under the name VFIND®) the proscribed code scanner available the proscribed code scanner analyzes the code according to its configuration settings. These settings can take numerous forms, including scanning for proscribed code or code segments, calculating hash codes of the code or code segment, etc.

If the proscribed code scanner scans code segments or calculates hash codes, it compares the result(s) to one or more database(s) of proscribed code samples. If the result(s) match the samples, and therefore the code is not acceptable, then a number of options may be available, as is described further below.

For example, the user might wish to intercept, examine and/or control sexually harassing text. Any instant messages might contain text that might be offensive, and so the user can provide words and/or terms (i.e. code) that she might wish to be identified as sexually harassing to the proscribed code scanner. Moreover, embodiments may be utilized for control of messages received by another, such as when a parent wishes to scan messages received by her child. Thus, configurations are supplied enabling for the scanning of preconfigured words as well as user supplied words.

The proscribed code scanner is provided with one or more proscribed code database(s), which may be modified by the user in the preferred embodiments. Thus, flexibility is provided to the user. (The databases are secured against unauthorized changes, in manners known in the art.) Moreover, in certain embodiments, preconfigured databases provide areas of proscribed code, e.g. a database for sexually harassing code, racially harassing code, age appropriate code (e.g. 3-8, 9-12, etc.), etc.

It may be desired, as well, to provide for manual and/or automatic downloading of updated and/or optional databases as well. In this way a user can tailor the product to her use.

If the code is acceptable, the proscribed code scanner provide an indicator to cyb_protocold which in turn will send the code back through tpicept and from there back to the communication stream. In this case, the process will have been transparent, that is, the interception process will not have disturbed the application. Thus, this embodiment has minimal impact on the computer and networking connections.

If the code is not acceptable, the proscribed code scanner will indicate the code is not acceptable. In the especially preferred embodiments, that indication will be sent directly to the user and/or the application. In other embodiments, the indicator may result in access to the code being denied; in extracting the proscribed code from the remainder; in quarantining and saving or transferring the proscribed code for analysis or deleted; the proscribed code could be modified; the proscribed code could be sent to an administrator or security department or firm; etc. The code may be sent to another communications channel, whether or not acceptable.

Code may be also certified by a certification component. Thus, if the code is acceptable, it may be sent from a scanner accompanied by a certification mark or other designation (e.g. message stamp, authentication, registration, etc.) Notification of certification may also be sent to the sender as well.

Embodiments may also translate intercepted code. For example, if code sent to an unauthorized instant messaging program on a system is intercepted, and approved for transmittal, yet, for security reasons the instant messaging program is not permitted, and necessary program parameters may be translated (e.g., protocols, formatting, etc.) so the code may be received by an authorized program, such as email, authorized instant messaging programs, etc.

Figure 2:
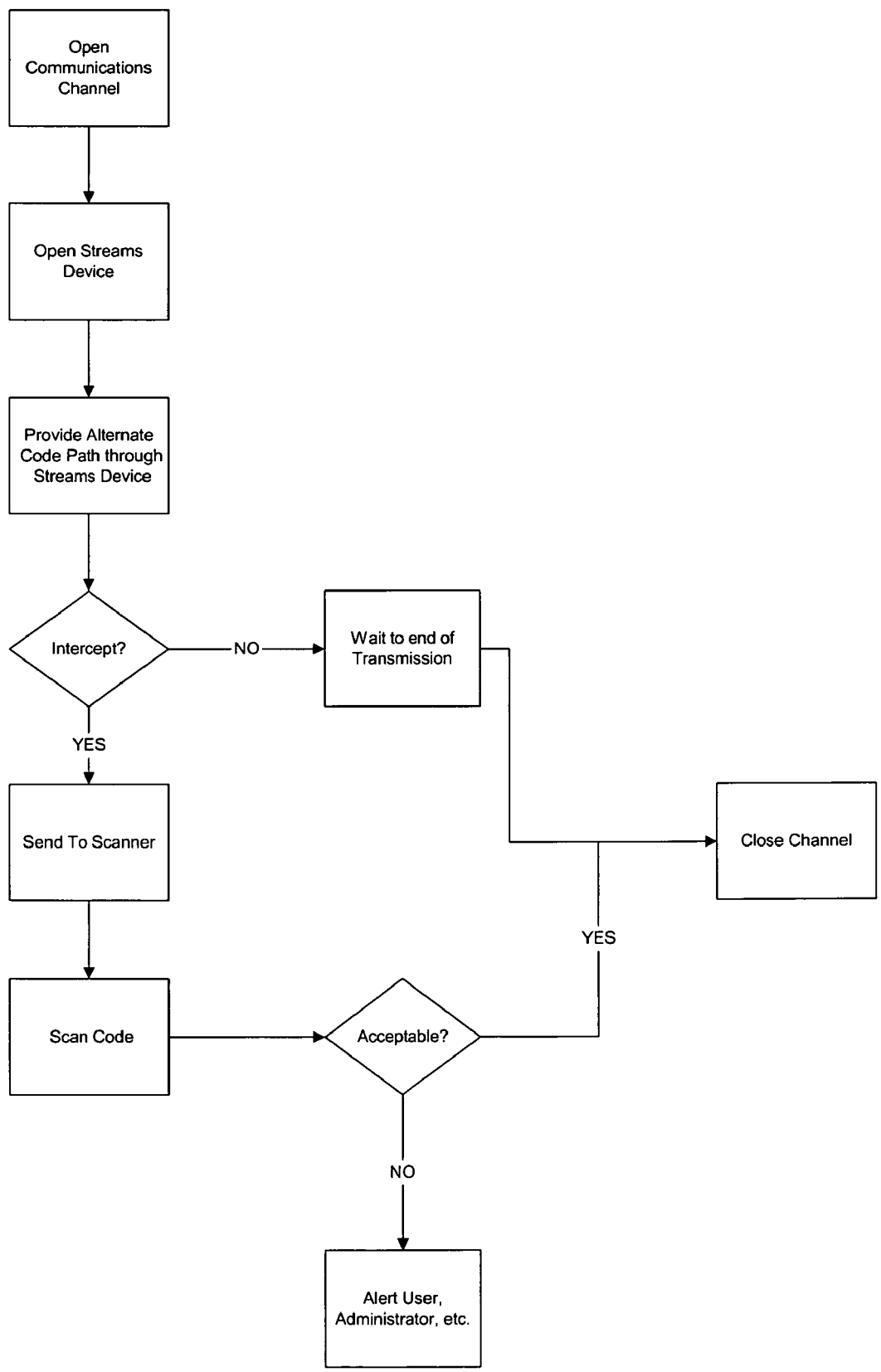
FIG. 2 is a schematic diagram of operation of a preferred embodiment.

The process of this embodiment is shown generally at FIG. 2.

It should be noted that more than one instance of the embodiment will be utilized if the user has more than one application running and/or more than one communications channel opened. For example, if a user opens an instant messaging application over a network card communication channel as well as a sendmail application over a network card communication channel two code streams will be created, both using TCP. Both will be intercepted according to the process of the preferred embodiments. Moreover, if channels are opened using other protocols at the Transport layer, or other protocols at other layers, embodiments of the present invention can be used to intercept those communications, with an appropriate kernel module.

Of course, any configuration parameters are not limited to predetermined parameters. For example, the interception parameters of the intercept module, protocol scanner and the proscribed code scanner may be configured in various ways in various embodiments. Moreover, the user may configure and reconfigure the parameters as desired. In yet other embodiments, there may need to be no interception parameters—interception can be turned off—or no predetermination of interception parameters. For example, a user may decide to intercept all code, or the embodiment could request parameters as code is being transferred or could request an interception decision as the code is being transferred. Of course, in yet other embodiments, the choice of predetermined, non-predetermined, or no interception parameters, and what parameters to change could be offered to either or both end-users or network administrators.

Of course, other embodiments may be configured differently. For example the protocol scanner may be written as one or more STREAMS modules, and the connections to and from the intercept module and the proscribed code scanner would be modified appropriately.

Another especially preferred embodiment is written for the Windows® NT platform. In this NT embodiment, installation of this embodiment begins with installing csiservice.exe in an appropriate directory or directories, e.g., WinNT\System32\, as well as csitcpip.sys, an NT driver, in an appropriate directory or directories (usually, WinNT\System32\drivers). csiservice.exe provides the driver to the system when called. The protocol scanner and the proscribed code scanner are also installed at this time in appropriate directories, e.g., WinNT\System32\.

Figure 3:
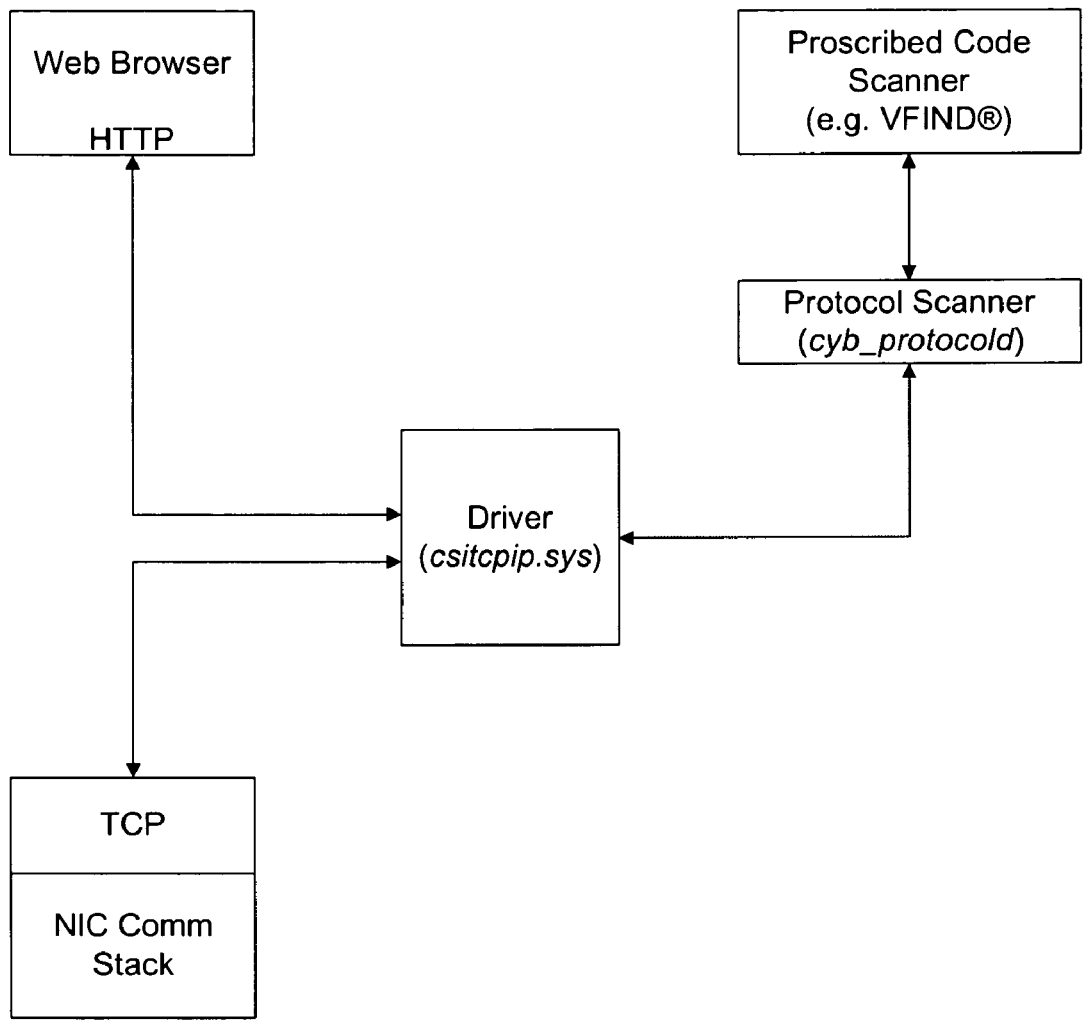
FIG. 3 is a schematic diagram of operation of a preferred embodiment.

After rebooting, csiservice.exe calls the driver, which in turn, will call the protocol scanner if code is transmitted through a communications stack which the driver has been configured to intercept. The interception settings and processes, which may be set in any of a number of ways, are as described above with regard to the UNIX® preferred embodiments. FIG. 3 shows an example of a process of a preferred WinNT embodiment intercepting code in a NIC communications stack.

As had been described above, embodiments may intercept encrypted code. Embodiments may also encrypt code after interception. For example, an entire communications stream may be encrypted by using a VPN-protected session (such as a PPTP, L2TP, or IPSec tunnel.) A message and/or other code, e.g. a file, might be encrypted as well. Therefore, embodiments are provided to process altered code. Altered code is defined herein as code altered by encryption or a communication protocol after being generated by an application or program for transmission to a complementary encryption or communication protocol.

In order to intercept the altered code, embodiments are used in a "man in the middle" implementation. For example, both SSL and S/MIME alter code by securing code through encrypting and decrypting code on both the server and client ends of the communication with a fixed key. SSL is a protocol layer encryption used in TCP connections and implemented between the HTTP layer and the TCP layer. Code is encrypted as it passes through the SSL protocol layer. S/MIME secures code by encrypting mail messages and their attachments through a mail application.

Figure 4:
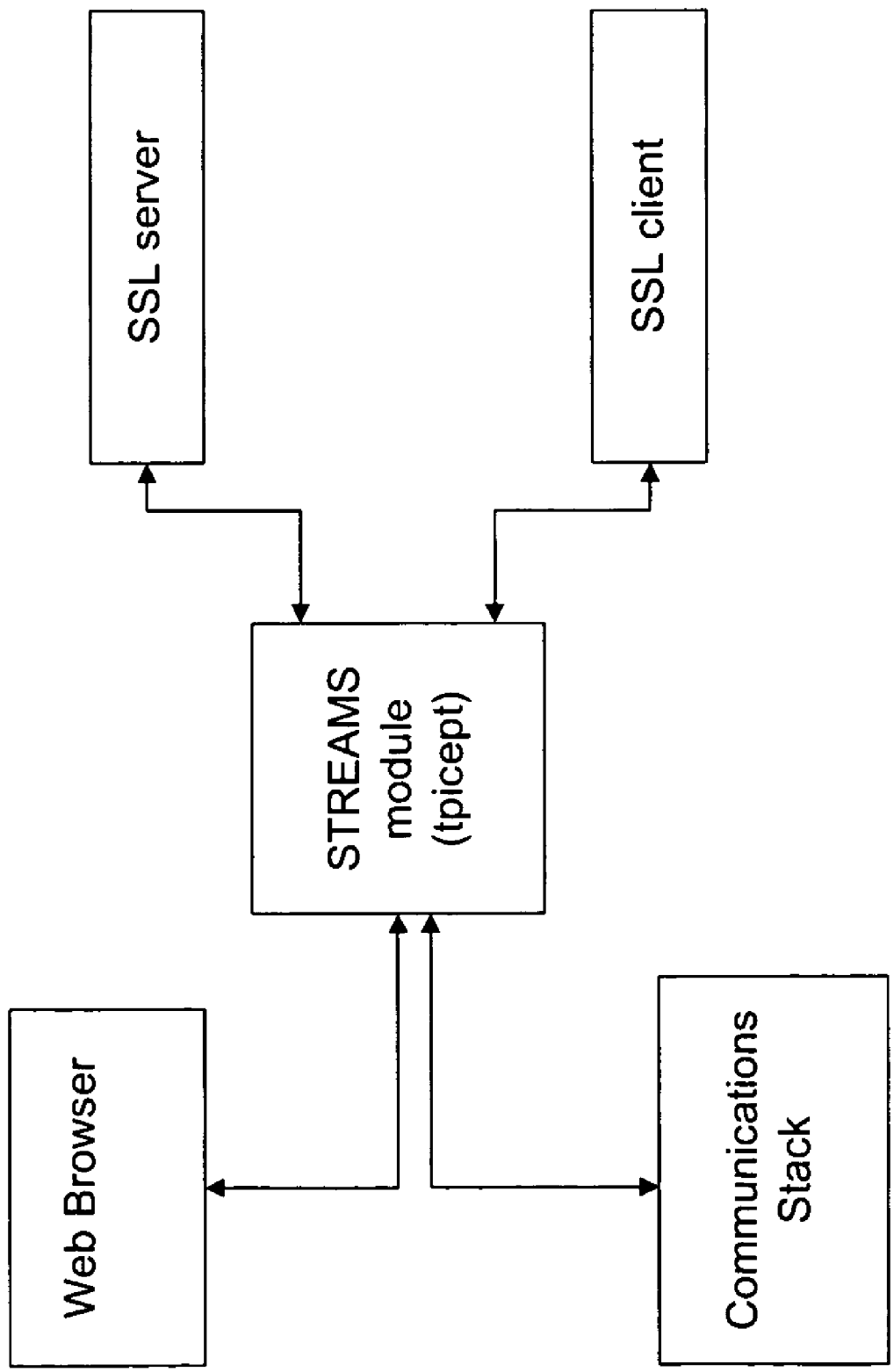
FIG. 4 is a schematic diagram of operation of a preferred embodiment.

In the preferred Unix® embodiments, when an instant messaging or other application opens a STREAMS device, a STREAMS module tpicept will be inserted in the stream. As shown in FIG. 4, tpicept intercepts code passing in the stream. (The remainder of the stream or communications stack is not shown here.) If the instant messaging application opens a secure connection, for example the HTTPS connection shown in the figure, the tpicept module will detect the opening and call a protocol SSL server and protocol SSL client, as is described in more detail below.

The tpicept STREAMS module begins the interception when tpicept detects a connection to a specific port, such as a port commonly used for instant messaging. tpicept opens a channel to a protocol SSL server instance in order to send code to the protocol SSL server. tpicept will also open a protocol SSL client instance. The protocol SSL server and the protocol SSL client will continue with the usual SSL negotiations, including the choice of encryption keys, thus placing themselves in the position of the SSL server that the user client application expects to communicate with and the SSL client that the SSL network expects to communicate with.

Figure 5:
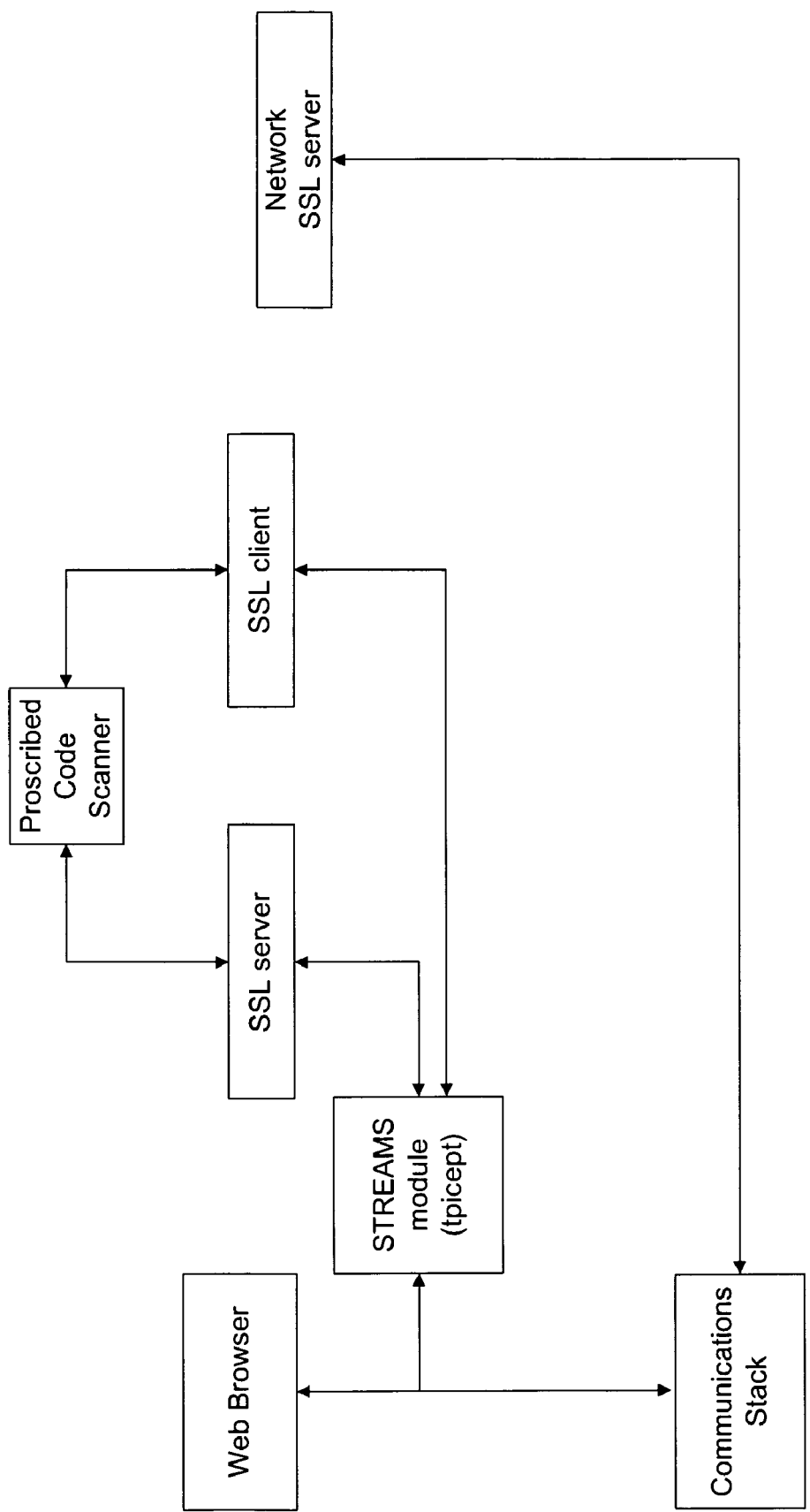
FIG. 5 is a schematic diagram of operation of a preferred embodiment.

Turning to FIG. 5, once the protocol SSL server and protocol SSL client are called, all communications through the stream will pass through those connections. (The remainder of the stream or communications stack is not shown here.) The protocol SSL server will decrypt the communications and, in the especially preferred embodiments, send the communications to a proscribed code scanner. The proscribed code scanner will in turn scan the code, as was described in the above embodiments with regard to the proscribed code scanner of FIGS. 1-3.

Figure 6:
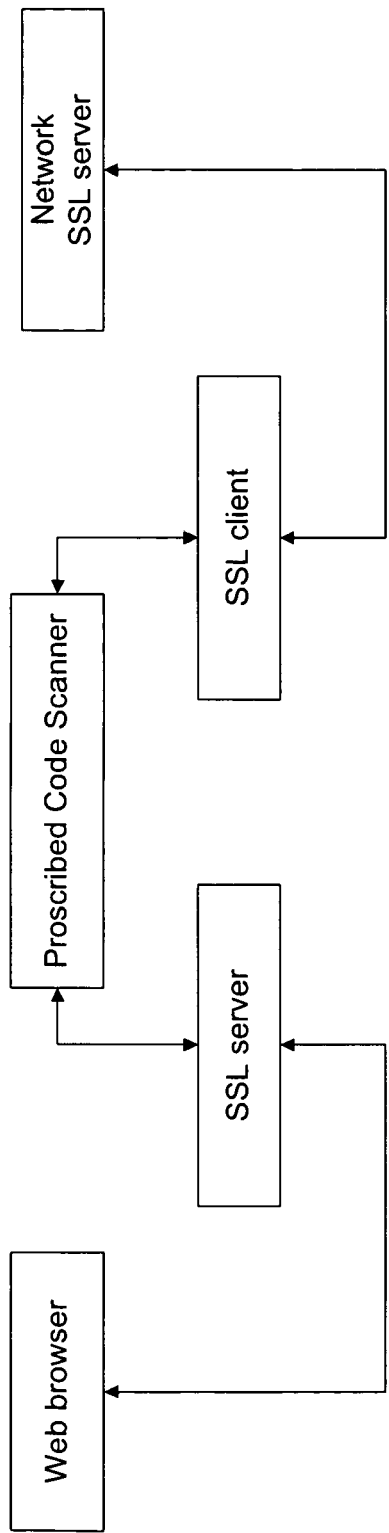
FIG. 6 is a schematic diagram of operation of a preferred embodiment.
Figure 7:
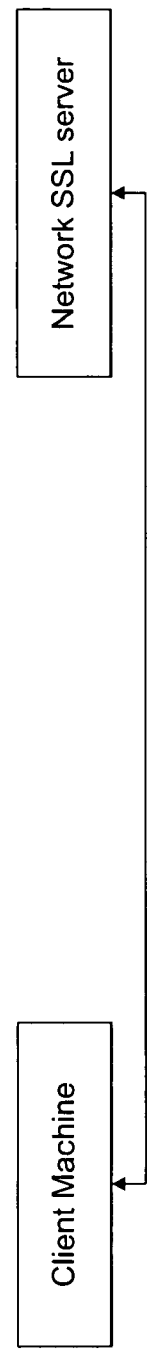
FIG. 7 is a schematic diagram of a prior art embodiment.

In the preferred embodiments, implementing a single SSL connection as shown in FIG. 6, the user client application identifies a single remote site with a single server certificate, such as shown in the prior art schematic diagram of FIG. 7. Thus there are two SSL connections opened on either side of the "man in the middle," as can be seen in the schematic diagram of FIG. 6, rather than one, as would be the case without the "man in the middle" interception, as can be seen in the prior art schematic diagram of FIG. 7.

The user's certificate database—necessary for a SSL connection—usually is managed through the user client application. In some embodiments, this database cannot be modified directly. (However, it may be possible in other embodiments to modify this database directly.) In some embodiments, automatic verification of site specific certificates may occur, however, certificates from certificate authorities may not be accepted. If a certificate from an untrusted site is received, an notification component of the embodiment may notify the user and/or administrator of the untrusted certificate and requesting confirmation. If the user and/or administrator indicates that the certificate should be stored, then the notification component will store the certificate in its own global certificate database. Alternatively, the user or administrator could then import this certificate into the instant messaging database. If a certificate authority provides an unknown certificate, the certificate could be added to the instant messaging database through manners known in the art.

Figure 8:
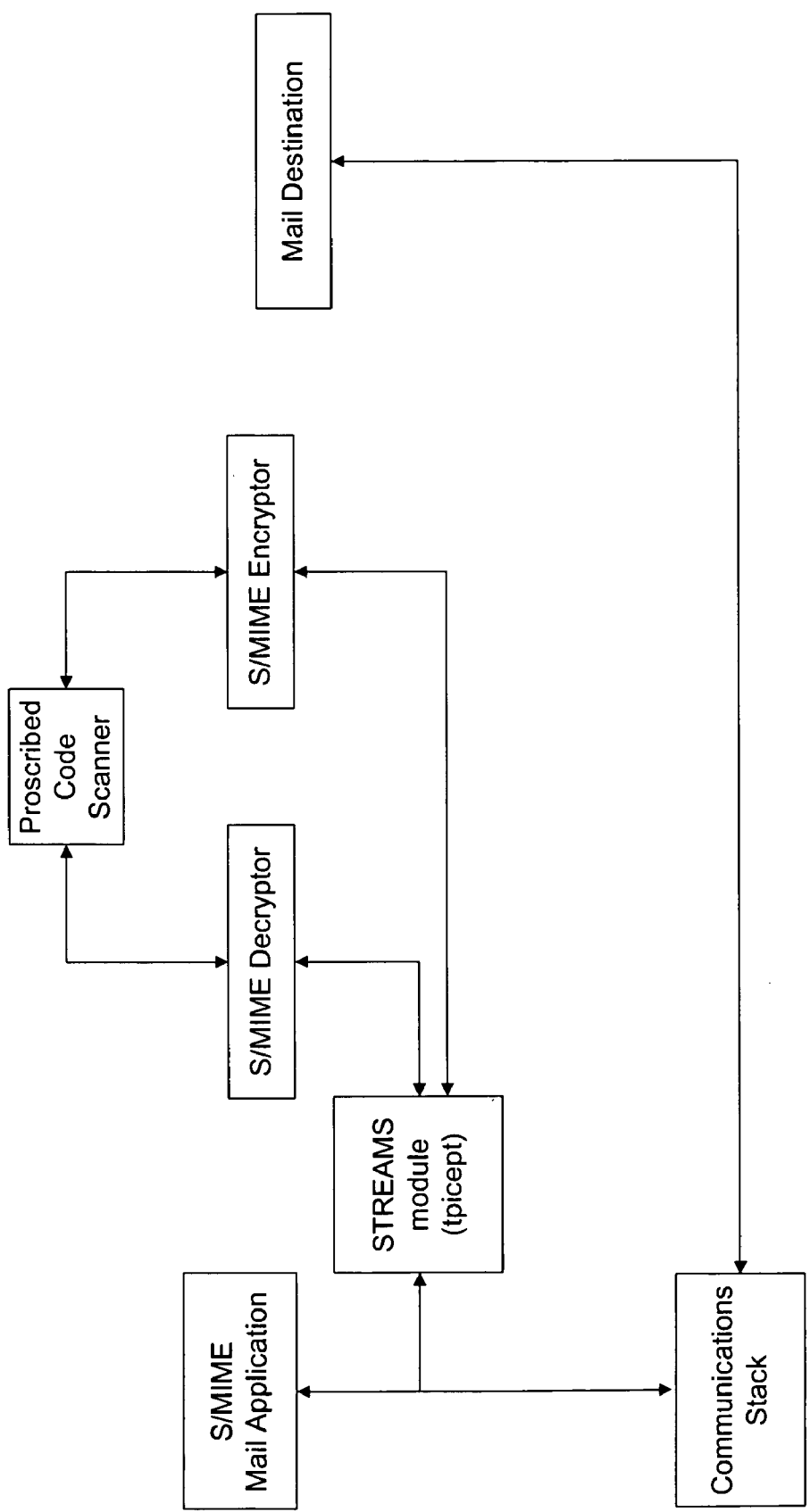
FIG. 8 is a schematic diagram of operation of a preferred embodiment.

FIG. 8 shows the preferred embodiment in the course of intercepting S/MIME code transfers. An S/MIME instant messaging application has been opened and the tpicept STREAMS module intercepts all code sent to and from the application by inserting itself on the communications stack as described above with regard to SSL interception. The tpicept module has called an S/MIME encryptor component and an S/MIME decryptor component, which in some embodiments are installed along with SSL server/client components similar to those described above. S/MIME code is then sent to the S/MIME decryptor component by the intercept module which decrypts the code in order to then send the code to a queue, where the code awaits scanning by a proscribed code scanner.

Proscribed code scanning in any of the altered code embodiments proceeds in a similar fashion as was described above with regard to the proscribed code scanner of FIGS. 1-3. If the code is acceptable, the proscribed code scanner will indicate to the protocol SSL client, S/MIME encryptor, other encryptor, etc. that the code is acceptable and can pass through the system. The protocol SSL client, S/MIME encryptor, other encryptor, etc. that, will re-encrypt the code, and return the code to the communications stack through the tpicept module. The process will have been virtually transparent, that is, the interception process will have minimal impact on the performance of the computer and networking connections.

If the code is not acceptable, actions such as were described in the above embodiments with regard to the proscribed code scanner of FIGS. 1-3 will be taken.

The proscribed code scanner analyzes the code according to its configuration settings. These settings take numerous forms, similar to those described above with regard to the proscribed code scanner of FIGS. 1-3. Similarly, configuration is similar to that described above.

It should be noted, in order for the S/MIME decryptor component to decrypt the mail, the private key of the sender or recipient of the mail must be located and used. If the key is not found, the mail is stored or quarantined in this embodiment and the user or administrator will be notified to supply the key or its location. When the embodiment stores or quarantines received mail in this embodiment, the sender or originator will have no direct indication that this has occurred. Therefore, the storage or quarantine area is preferably checked manually. Other embodiments may notify the user, through methods known in the art, that intercepted mail is waiting in the received storage area.

Other preferred embodiments are written for the Windows® NT platform. In the especially preferred NT embodiment, installation of this embodiment begins with installing csiservice.exe in an appropriate directory or directories, e.g., WinNT\System32, as well as csitcpip.sys, an NT driver, in an appropriate directory or directories (usually, WinNT\System32\drivers). csiservice.exe provides the driver to the system when called. The protocol scanner and the proscribed code scanner are also installed at this time in appropriate directories, e.g., WinNT\System32.

After rebooting, csiservice.exe calls the driver, which in turn, will call the protocol scanner when a Web browser or other application opens a secure connection. The interception settings and processes, which may be set in any of a number of ways, are as described above with regard to the UNIX® preferred embodiments.

The man in the middle embodiments may be used in any of a number of interception environments, and those embodiments may be constructed in accordance with the present invention, including interception of encryption and other communication protocols known and unknown in the art. Certain embodiments may as well combine interception processes, e.g. combining both SSL and S/MIME interception processes in one embodiment, or other combinations of encryption or other communication protocols. It is also possible to encrypt messages that might have been originally encrypted, as well as the reverse.

It should also be noted that the man in the middle embodiments are not limited to use of a protocol parser, such as a Unix® intercept module, WinNT driver or other interception means. For example, embodiments implemented on a local instant messaging application may replace a local delivery agent with S/MIME decryptor/encryptor components which in turn will have the code scanned by a proscribed code scanner as described above.

The preferred embodiments may be used on a single machine, with a connection to another machine or system, network or the Internet. Preferred embodiments may also be used on a separate machine or system inserted in a communications channel, including but not limited to another computer, proxy server, firewall, router and the like. Embodiments may also be invisible to the user, be operational in stealth mode, etc. Results may be logged, automatically and/or manually.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

The invention claimed is:

1. An apparatus for processing code comprising: at least one electronic device component for intercepting, examining and controlling code that is being communicated as a code stream on a communications channel, said electronic device component being provided with a protocol parser capable of discriminating among different protocols implemented on top of the transport layer; and, a proscribed code scanner; whereby said protocol parser intercepts instant messaging or peer-to-peer code on a communications channel and transmits said code for review by said proscribed code scanner, said protocol parser being provided to parse protocols on top of the transport layer; wherein said apparatus is configurable to process multiple code streams created when more than one communications channel is opened;

the apparatus including at least one kernel module that is linked to a number of path names and remains operable, and wherein a kernel is configured to operate to intercept code streams when an application that the kernel module is linked to is opened, wherein said application calls the kernel to insert a kernel module in the code stream, and wherein said kernel module intercepts code passing in the stream;

wherein the kernel module is configured to intercept at least code comprising instant messaging or peer-to-peer code, wherein said interception is based on one or more of code based or port based interception.

2. An apparatus as in claim 1 further comprising a translation means whereby said translation means translates said code to authorized program parameters.

3. An apparatus as in claim 1 further comprising a protocol scanner, whereby said protocol parser transmits said instant messaging or peer-to-peer code to said proscribed code scanner through said protocol scanner.

4. An apparatus as in claim 3, wherein said protocol scanner further comprises a configuration means for configuring interception parameters.

5. An apparatus as in claim 1 whereby said proscribed code scanner further comprises a scanning means and an indicator means.

6. An apparatus as in claim 1 further comprising a certification means.

7. An apparatus as in claim 5 whereby said indicator means provides an indication of the presence of proscribed code after scanning said intercepted code.

8. An apparatus as in claim 1, whereby said proscribed code scanner comprises a malicious code scanner.

9. An apparatus as in claim 1, wherein said protocol parser further comprises a configuration means for configuring interception parameters.

10. An apparatus as in claim 1, further comprising a decryption component, whereby said protocol parser intercepts said instant messaging or peer-to-peer code being transmitted through said communications channel and transfers said code to said decryption component for decryption and scanning by said proscribed code scanner.

11. An apparatus as in claim 10, further comprising an SSL decryption component.

12. An apparatus as in claim 10, further comprising an S/MIME decryption component.

13. An apparatus as in claim 10, further comprising an encryptor, wherein said code, after being processed by said proscribed code scanner, may be encrypted by said encryptor.

14. An apparatus as in claim 1, further comprising an encryptor, wherein said code, after being processed by said proscribed code scanner, may be encrypted by said encryptor.

15. An apparatus for processing code comprising: at least one electronic device component for intercepting, examining and controlling code that is being communicated as a code stream on a communications channel, said electronic device component being provided with a protocol parser capable of discriminating among different protocols implemented on top of the transport layer; and, a proscribed code scanner; whereby said protocol parser intercepts short messaging code from said code stream on a communications channel and transmits said code for review by said proscribed code scanner and said protocol parser being provided to parse protocols on top of the transport layer;

the apparatus including at least one kernel module that is linked to a number of path names and remains operable, and wherein a kernel is configured to operate to intercept code streams when an application that the kernel module is linked to is opened, wherein said application calls the kernel to insert a kernel module in the code stream, and wherein said kernel module intercepts code passing in the stream;

wherein the kernel module is configured to intercept at least code comprising short messaging, wherein said interception is based on one or more of code based or port based interception.

16. An apparatus for processing code comprising: at least one electronic device component for intercepting, examining and controlling code that is being communicated as a code stream on a communications channel, said electronic device component being provided with a protocol parser capable of discriminating among different protocols implemented on top of the transport layer; a protocol scanner; and, a proscribed code scanner comprised of a scanning means and an indicator means; whereby said protocol parser intercepts instant messaging or peer-to-peer code on a communications channel and transmits said code to said proscribed code scanner through said protocol scanner, said protocol parser being provided to parse protocols on top of the transport layer;

the apparatus including at least one kernel module that is linked to a number of path names and remains operable, and wherein a kernel is configured to operate to intercept code streams when an application that the kernel module is linked to is opened, wherein said application calls the kernel to insert a kernel module in the code stream, and wherein said kernel module intercepts code passing in the stream;

wherein the kernel module is configured to intercept at least code comprising instant messaging or peer-to-peer code, wherein said interception is based on one or more of code based or port based interception.

17. An apparatus for processing code comprising: at least one electronic device component for intercepting, examining and controlling code that is being communicated as a code stream on a communications channel, said electronic device component being provided with a protocol parser capable of discriminating among different protocols implemented on top of the transport layer; a proscribed code scanner; a protocol scanner; a decryption component, whereby said protocol parser intercepts instant messaging or peer-to-peer code on a communications channel and transfers said code to said decryption component for decryption and scanning by said proscribed code scanner, said protocol parser being provided to parse protocols on top of the transport layer, the apparatus including at least one kernel module that is linked to a number of path names and remains operable, and wherein a kernel is configured to operate to intercept code streams when an application that the kernel module is linked to is opened, wherein said application calls the kernel to insert a kernel module in the code stream, and wherein said kernel module intercepts code passing in the stream;

wherein the kernel module is configured to intercept at least code comprising instant messaging or peer-to-peer code, wherein said interception is based on one or more of code based or port based interception.

18. A method for processing code comprising: providing a computing component with storage media, and configuring the storage media with software for implementing the following: intercepting instant messaging or peer-to-peer code that is being communicated as a code stream on a communications channel; parsing said code; and, scanning said code for the presence of proscribed code; and, providing an indicator for the presence of said proscribed code, wherein parsing said code comprises discriminating among different protocols;

wherein the computing component includes at least one kernel module that is linked to a number of path names and remains operable, and wherein a kernel is configured to operate to intercept code streams when an application that the kernel module is linked to is opened, wherein said application calls the kernel to insert a kernel module in the code stream, and wherein said kernel module intercepts code passing in the stream;

wherein the kernel module is configured to intercept at least code comprising instant messaging or peer-to-peer code, wherein said interception is based on one or more of code based or port based interception.

19. A method as in claim 18 further comprising translating said code to authorized program parameters.

20. A method as in claim 18 further comprising said code.

21. A method as in claim 18 further comprising returning said code to said communication channel if said indicator is negative.

22. A method as in claim 18 further comprising transferring said code to another communication channel.

23. A method as in claim 18 further comprising further indicating the presence of said proscribed code if said indicator is positive.

24. A method as in claim 18 wherein intercepting said code further comprises intercepting the code according to configured parameters.

25. A method as in claim 18 wherein scanning said code for the presence of proscribed code further comprises scanning said code for the presence of malicious code.

26. A method as in claim 18 further comprising decrypting said code.

27. A method as in claim 26 further comprising reencrypting said code if said indicator is negative.

28. A method as in claim 26 wherein decrypting said code is preceded by intercepting said code prior to decrypting said code.

29. A method as in claim 26 wherein said code is secured through SSL encryption.

30. The method as in claim 29, wherein parsing said code is accomplished with a parser, and wherein the method includes intercepting with said parser a request from one or the other of an original client and an original server for an SSL transfer, creating with said parser a new SSL server that communicates with said client and a new SSL client that communicated with said server, and intercepting with said SSL client and said SSL server communications that occur between said original client and said original server.

31. A method as in claim 26 wherein said code is secured through S/MIME encryption.

32. A method as in claim 26 further comprising the step of: reencrypting said code if said indicator is negative.

33. A method as in claim 26 further comprising providing a separate system inserted in said communications channel, and with at least one of said steps of intercepting said code; decrypting said code; scanning said code for the presence of proscribed code, and providing an indicator for the presence of said proscribed code, occurring on said separate machine.

34. A method as in claim 18 further comprising encrypting said code.

35. A method for processing code comprising: providing a computing component with storage media, and configuring the storage media with software for implementing the following: intercepting short messaging code that is being communicated as a code stream on a communications channel; parsing said code; scanning said code for the presence of proscribed code; and, providing an indicator for the presence of said proscribed code, wherein parsing said code comprises discriminating among different protocols;

wherein the computing component includes at least one kernel module that is linked to a number of path names and remains operable, and wherein a kernel is configured to operate to intercept code streams when an application that the kernel module is linked to is opened, wherein said application calls the kernel to insert a kernel module in the code stream, and wherein said kernel module intercepts code passing in the stream;

wherein the kernel module is configured to intercept at least code comprising short messaging, wherein said interception is based on one or more of code based or port based interception.

36. A method for processing code comprising: providing a computing component with storage media, and configuring the storage media with software for implementing the following: intercepting instant messaging or peer-to-peer code that is being communicated as a code stream on a communications channel; decrypting said code; parsing said code; scanning said code for the presence of proscribed code; and, providing an indicator for the presence of said proscribed code, wherein parsing said code comprises discriminating among different protocols;

wherein the computing component includes at least one kernel module that is linked to a number of path names and remains operable, and wherein a kernel is configured to operate to intercept code streams when an application that the kernel module is linked to is opened, wherein said application calls the kernel to insert a kernel module in the code stream, and wherein said kernel module intercepts code passing in the stream;

wherein the kernel module is configured to intercept at least code comprising instant messaging or peer-to-peer code, wherein said interception is based on one or more of code based or port based interception.

\* \* \* \* \*